June 30, 1970  J. C. GOFF  3,518,339
METHOD FOR CUSHIONING AND SEALING
Filed Aug. 18, 1965
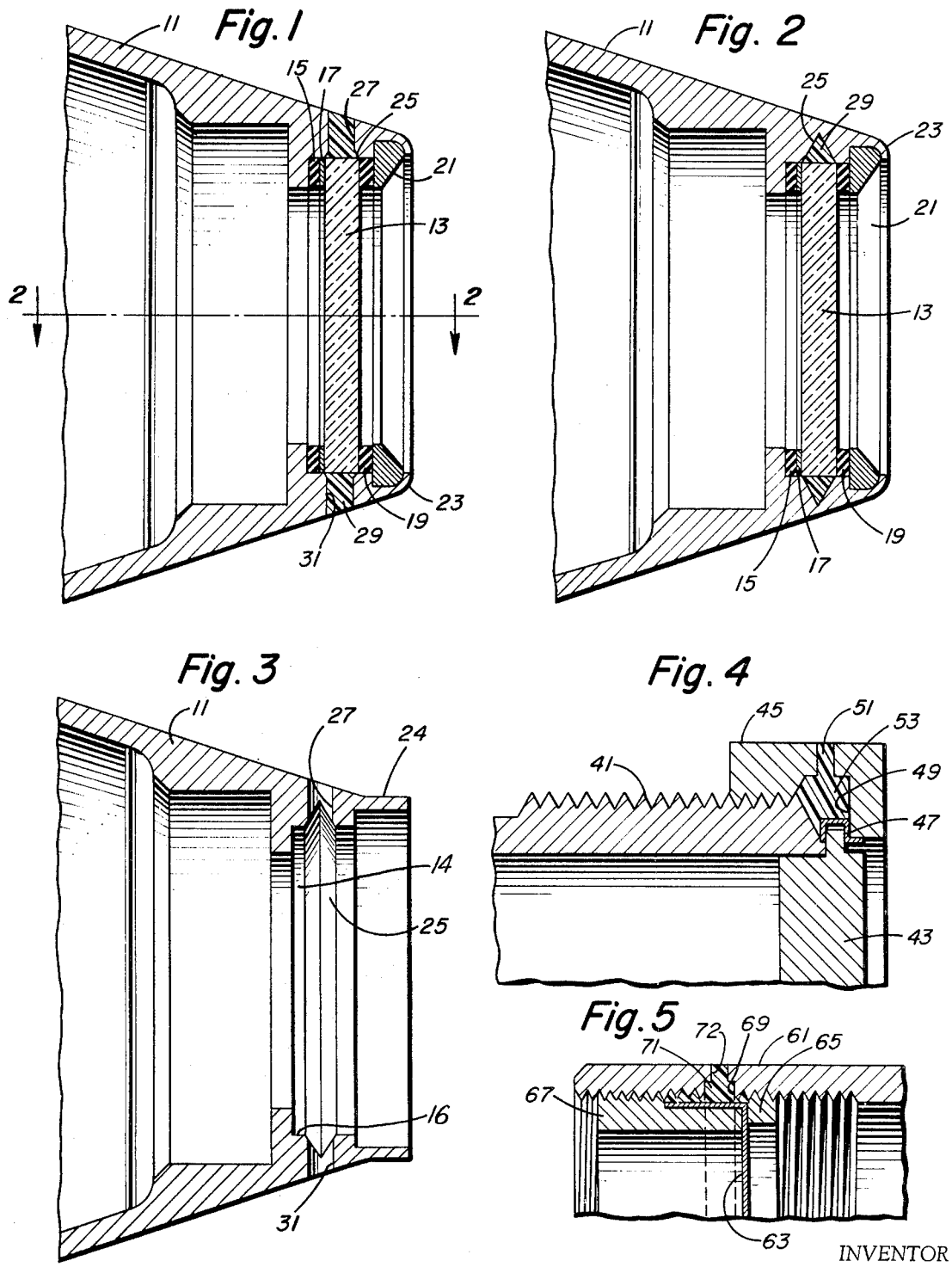
INVENTOR
John C. Goff
BY
ATTORNEY

United States Patent Office 3,518,339
Patented June 30, 1970

3,518,339
METHOD FOR CUSHIONING AND SEALING
John C. Goff, Silver Spring, Md., assignor to the United States of America as represented by the Secretary of the Navy
Filed Aug. 18, 1965, Ser. No. 480,831
Int. Cl. B29d 3/00
U.S. Cl. 264—249                              1 Claim

ABSTRACT OF THE DISCLOSURE

A method of cushioning and sealing a fragile disc within a tubular member by forming an annular recess adjacent the end of the tubular member with a circumferential groove therein, inserting the disc within the annular recess with a gasket on either side thereof in such a manner as to peripherally enclose the groove, positioning a retaining ring within the annular recess, crimping the end portion of the tubular member about the retaining ring, and filling the groove with an epoxy resin.

---

The invention described herein may be manufactured and used by or for the Government of the United States of America for governmental purposes without the payment of any royalties thereon or therefor.

This invention relates to the cushioning and sealing of parts within a tubular member. In the past, the problem of sealing joints and sealing and cushioning fragile materials which are subject to extreme shock and wide temperature variations, it has been the normal practice to provide such a seal with molten metals. Sealing under these conditions must be very carefully controlled and such seals may not withstand wide temperature variation. In the instant invention an epoxy resin or a rubber-like cementing compound is used to provide both sealing and cushioning of parts. Annular grooves are provided which surround a diaphragm or other part to be cushioned or sealed. Holes are provided 180° apart such that the epoxy resin may be injected through one of the holes and exited from the other of the holes when the annular grooves surrounding the member to be cushioned or sealed is filled with the epoxy resin. The use of such an injected semi-flexible epoxy resin provides extremely high quality and adaptable seal and a method of installing a diaphragm as in the seal and means of cementing and sealing the fragile material in high shock applications. This new means and process is efficiently reliable and will work over a wide range of sizes, conditions and surface quality of components and will remain as a good seal at temperature ranges from —65° F. to 160° F. and will withstand shocks of 30,000 g.

An object of this invention is to provide sealing means which will be effective over a temperature range of —65° F. to 160° F.

Another object of this invention is to provide cushioning means which will withstand shocks of 30,000 g.

A further object of this invention is to provide an annular seal of epoxy resin for mounting a fragile part within the tubular member.

Other objects and many of the attendant advantages of this invention will be readily appreciated as the same becomes better understood with reference to the following detailed description when considered in connection with the accompanying drawing in which like reference numerals designate like parts throughout the figures thereof and wherein:

FIG. 1 of the drawings illustrates in cross-section the mounting of a frangible element within a tubular member;

FIG. 2 of the drawings illustrates in cross-section an embodiment of the invention in which a V-shaped annular groove is employed;

FIG. 3 of the drawings illustrates an embodiment of the invention employing the V-shaped groove in which the entry and exit holes for the epoxy resin are shown;

FIG. 4 of the drawings illustrates means for mounting a plate within a threaded tubular section; and FIG. 5 of the drawings illustrates in section an assembly for mounting a diaphragm within a tubular member.

Referring now to FIG. 1 of the drawings a tubular housing 11 is shown containing a fragile element such as the glass crystal, lens, or other solid material. A fragile member 13 is shown held in place laterally by gaskets 15, 17 and 19. The fragile member 13 and the gaskets are held in place by a retaining ring 21 which presses against gasket 19. The retaining ring is held in place by a crimped end portion 23 of tubular member 11. A groove 25 is provided in the tubular member which groove adjoins the outer circumferential surface of the fragile member 13. A first hole 27 adjoins the outer surface of the tubular member to the groove to provide for entrance of an epoxy resin 29. A second or exit hole 31 is provided for the exit for the excess of epoxy resin. Referring now to FIG. 2 of the drawings, a similar tube 11 is shown in which a fragile material such as the glass crystal 13 is shown therein. The crystal is held in place by gaskets 15, 17 and 19 and by retaining ring 21 which is in turn held in place by the crimped portion 23 of the tubular housing. An annular groove 25 is shown which in this particular embodiment is V-shaped. V-shaped groove 25 joins or abuts the circumferential surface of glass crystal 13 to form an annular chamber therein for holding an epoxy resin 29. The entrance and exit holes are not shown in this particular illustration.

Referring now to FIG. 3 of the drawings a tubular housing 11 is shown having a V-shaped groove 25, an entrance hole 27 and an exit hole 31. It may be noted that the end portion 24 is straight rather than crimped as the portion may be crimped after the fragile material has been installed.

Referring now to FIG. 4 of the drawings a threaded tubular member 41 is shown having a plate member 43 mounted therein. A metallic collar 45 surrounds the circular flange portion of plate 43. A threaded ring 45 contains a groove 49 which is in communication with a metallic collar 47 and which together with collar 47 forms an annular chamber for holding the sealing compound. An entrance hole 51 is shown to provide for injecting the sealing compound 53.

Referring now to FIG. 5 of the drawings a tubular member 61 is provided with internal threads and is adapted for having a diaphragm seal mounted therein in diaphragm 63. A first threaded ring 65 is threadedly engaged with and positioned within the tubular member 61. Diaphragm 63 is cup-shaped and slips over the unthreaded end portion of a second threaded member 67. A groove 69 is provided in the tubular member 61 for holding an epoxy resin 71. An entrance hole 72 is shown for injecting the epoxy resin. The exit hole is not shown.

In each of the embodiments of illustration, the epoxy resin is applied by connecting an applicator containing the resin to the entrance hole and applying pressure to force the resin through the grooved chamber until the resin begins to flow out of the exit hole. For example in FIG. 1 of the drawings the epoxy resin is applied to groove 25 through entrance hole 27. The epoxy resin is then forced through hole 27 through the groove 25 until it begins to flow out of the exit hole 31, indicating that the chamber formed by groove 25 and fragile member 13 has been filled. Either of the holes of course may be used for filling in which case the other of the holes will be used as an exit hole.

The cement or epoxy resin may be any suitable material such as for example, a mixture of equal parts by weight of a substance known in the art as "Stycast 2741" and "Catalyst 15." These resin materials may be supplied by Emerson and Cuming Inc., of Canton, Mass.

The cement or epoxy resin may be applied by an "Epoxer" kit as supplied by The Kenics Corporation, Wakefield, Mass. The holes in an exemplary embodiment of the instant invention were .054 inch and a nozzle having an inside diameter of .030 and an outside diameter of .050 inch may be used with the epoxer kit. The container of the epoxer may be charged with compressed air having a pressure of approximately 100 p.s.i.

Obviously many modifications and variations of the present invention are possible in the light of the above teachings. It is therefore to be understood that within the scope of the appended claim the invention may be practiced otherwise than as specifically described.

What is claimed is:

1. A method of sealing a disc within a tubular member comprising the steps of forming an annular recess adjacent an end of said tubular member,
   forming a circumferential groove within said annular recess,
   forming a pair of diametrically opposed holes through the wall of said tubular member each extending from said groove to the outer surface of said tubular member,
   inserting a first gasket within said annular recess,
   inserting said disc within said annular recess to seat upon said gasket in a position such as to peripherally enclose said groove,
   inserting a second gasket within said annular recess,
   positioning a retaining ring within said annular recess to seat upon said second gasket,
   crimping the end portion of said tubular member about said retaining ring, and
   filling said groove with an epoxy resin through one of said holes.

References Cited

UNITED STATES PATENTS 2,331,917   10/1943   Kocher.
3,194,364   7/1965   Kolm _____ 350—67 X ROBERT F. WHITE, Primary Examiner T. J. CARVIS, Assistant Examiner U.S. Cl. X.R.

29—460, 511; 264—263, 267; 350—67